Nov. 21, 1967  H. E. MELTZER  3,353,268
SHRUB FORMER AND LAWN EDGE TRIMMER
Filed Oct. 15, 1965  2 Sheets-Sheet 1

INVENTOR
HENRY E. MELTZER

BY George H. Wright

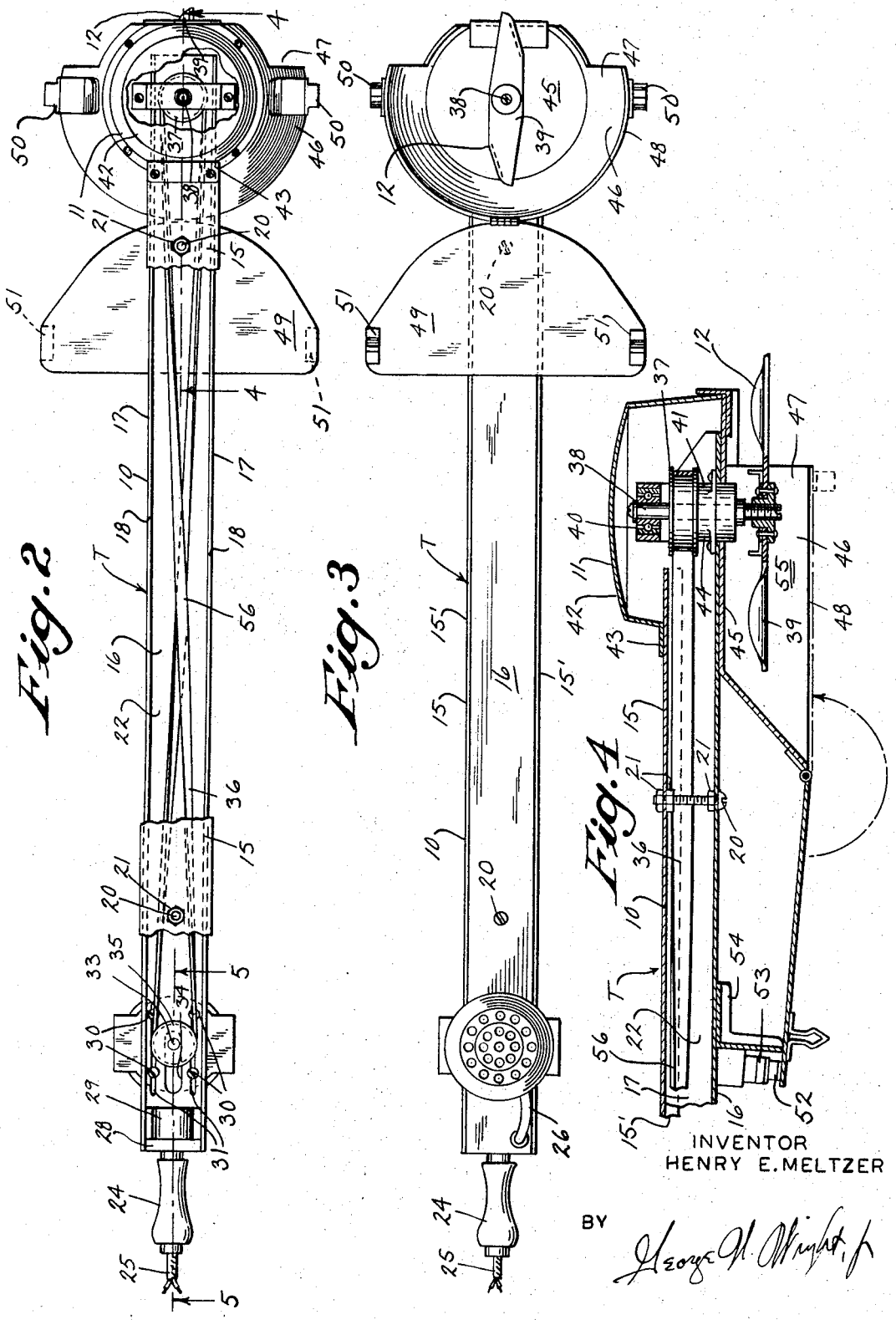

United States Patent Office 3,353,268
Patented Nov. 21, 1967

3,353,268
SHRUB FORMER AND LAWN EDGE TRIMMER
Henry E. Meltzer, 1745 Flett St., Racine, Wis. 53403
Filed Oct. 15, 1965, Ser. No. 496,444
2 Claims. (30—276)

ABSTRACT OF THE DISCLOSURE

A lawn manicuring device particularly adapted as a lawn edge trimmer and shrub hedge former comprising an elongated casing or handle carrying the shielded cutter blades at one end thereof and motor for operating the same at the other end to give a very fine balance and to provide for easy manipulating of the device. The motor is dependent in a casing at one end of the elongated handle and the cutter blades are completely shielded at the other upper ends and driven through a belt and pulley arrangement.

---

This invention appertains to lawn manicuring devices and more particularly to a novel shrub hedge former and lawn edge trimmer.

In the past, there have been many motor driven trimmers and cutters for cutting and forming hedges and shrubs; however, these known prior devices have either been too complicated, costly or heavy for long use. Further, they have been cumbersome so that when sculpturing hedges and shrubs, they have been hard to handle and balance.

Therefore, a prime object of my present invention is to provide a motor driven former and trimmer for hedges, shrubs and the like which can be easily and readily carried by the operator to form and artistically sculpture hedges and the like.

Another important object of the present invention is to provide a portable motor driven cutter than can also be used to trim the edges of lawn and the like.

A very important object of the present invention is to provide a motor driven former for shrubs and hedges that can be held in the hand of an operator in such a manner that the motor and cutter are balanced to provide ease of manipulation of the cutter and to overcome fatigue in its use.

A further object of the present invention is to provide a former for hedges and shrubs wherein the cutter is positioned remote from the operator and wherein provision is made to keep the cut debris from striking or being drawn back toward the operator.

Still another object of the present invention is to provide a novel former and trimmer wherein the motor is carried at one end of an elongated casing and the cutter is positioned at the opposite far end thereof, and wherein the motor is mounted so as to be adjustable for giving proper tension to the drive belt.

A further important object of the present invention is to provide means whereby the cutting blades may be interchangeable so that different types of work may be accomplished such as trimming of edges of lawns, or forming ornamental designs in hedges, shrubs and the like.

A salient feature of the present invention resides in providing a safety cover for the lower portion of the revolving blade wherein the cover may act as a collector for debris that might otherwise be thrown back onto the operator and which cover in an open position will give free access to the blade for utilizing the entire blade portions for cutting and trimming.

Another object of the present invention is to provide a novel safety guard for the switch utilized for actuating the motor so that the motor will not be accidentally started upon hitting an object or conversely accidentally turned off.

A further object of the invention is to provide a simple, practical and reliable construction that is economical to manufacture, easy to assembly and positive in its operation.

With the above and other objects in view, which will more readily appear as the nature of the invention is better understood, the same consists in the novel construction, combination and arrangement of parts, hereinafter more fully described, illustrated and claimed.

A preferred and practical embodiment of the invention is shown in the accompanying drawings, in which FIGURE 1 is a side elevational view of the novel trimmer and former showing the same in actual use;

FIGURE 2 is a top elevational view on a slightly enlarged scale with certain parts being broken away to illustrate details in its construction;

FIGURE 3 is a bottom plan view of the device shown in FIGURES 1 and 2 of the drawings, with the cover illustrated in its open position to give full access to the blade;

Figure 5:
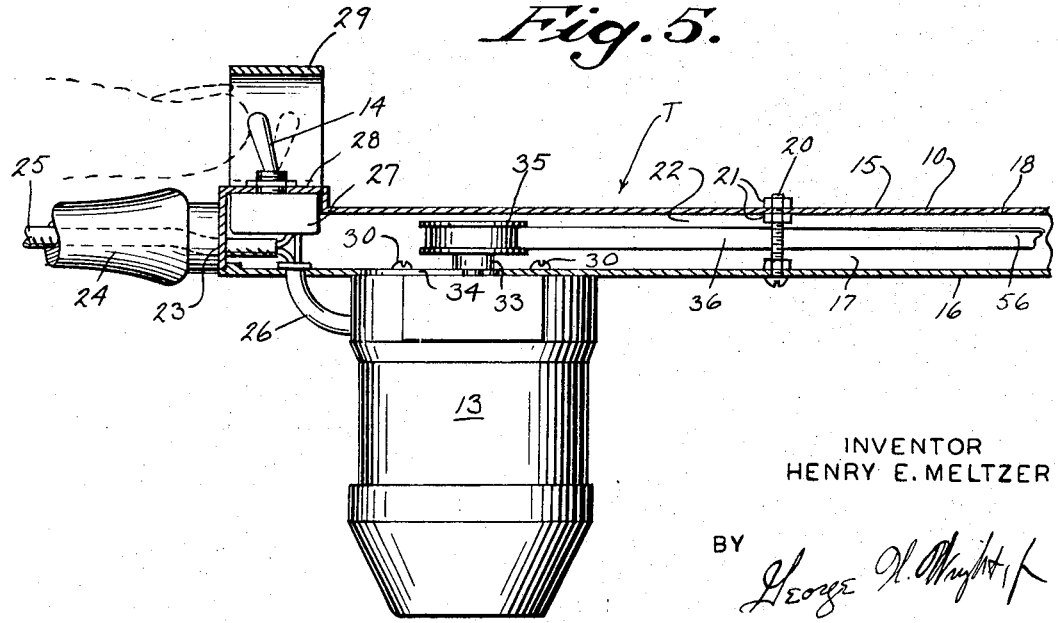

FIGURE 4 is an enlarged tragmentary longitudinal vertical section taken on the line 4—4 of FIGURE 2 of the drawings, looking in the direction of the arrows, the cover being shown in its open position in full lines and in its closed debris-gathering position in dotted lines, and FIGURE 5 is a fragmentary longitudinal section taken on the line 5—5 of FIGURE 2 of the drawings, and looking in the direction of the arrows.

Referring now to the drawings in detail, wherein similar reference characters designate corresponding parts throughout the several views, the letter T generally indicates one type of the improved trimmer and former and the same includes broadly an elongated casing 10 carrying the housing 11 and cutter 12 on one end and the motor 13 and its switch 14 on the other end. Therefore, the casing 10 is preferably constructed of a light but strong and durable metal, such as aluminum, to provide a longitudinally extending top wall or cover 15 carrying depending flanges 15′, a bottom wall 16 and side walls 17. These walls may be joined in any desired manner, but in the preferred form bottom wall 16 and side walls 17 are formed integral and the bottom 15 is secured with flanges 15′ overlapping the peripheral edges 18 of the side walls 17 by means of threaded bolts 20 and the various nuts 21 to provide an elongated longitudinally extending space 22 within the casing 10. At the inner end of the casing 10, I provide the end walls 23 and secured thereto is a handle 24 through which extends electric cord 25 which provides the necessary current to operate the motor 13. Interposed between cord 25 and wires 26 to the motor is toggle switch 27 and this switch extends beyond an upwardly extending portion 28 of top wall or cover 15. Over switch 27 I provide a U-shaped guard wall 29 which is open at both ends so that thumb T or finger may be extended therethrough to operate the switch as shown more particularly in FIGURES 1 and 5 of the drawings.

Motor 13 is carried by the bottom wall 16 of the casing 10 and is mounted to the casing by means of screws 30 which are in turn received in elongated parallel slots 31. Therefore it can be seen that within the confines of the slots 31 the motor 13 can be moved longitudinally of the casing 10 to provide an adjustment which will become clearer as the description proceeds.

Drive shaft 33 extends through a centrally located slot 34 which is positioned between the spaced slots 31 and this drive shaft carries a drive pulley 35 over which is trained the drive belt 36. The forward end of belt 36 is trained about pulley 37. This pulley is splined or otherwise affixed to a shaft 38 to which blade 39 is detachably secured. Suitable bearings 40 and 41 are provided so that the shaft 38 will rotate freely in response to the rotation of the drive pulley 35. At the forward end of casing 10, I affix an enlarged housing 42 which is secured at the point 43 to the upper wall 15 of casing 10 and housing 44 for the shaft. Bearings are affixed to the lower wall 16 and extend through rearwardly projecting wall 45 and also depending side walls 46. The forward portion of the housing is open, as at 47, and part of the blade 39 extends forwardly therethrough. The bottom peripheral edges 48 also provide an opening which is closed by the pivoted cover 49. In order to firmly hold the cover in its closed position, I affix female clasp members 50 to the lower side peripheral edges of the walls 46 and provide male members 51 on the cover so that the cover may be latched and held in a closed dotted line position illustrated in FIGURE 4.

Figure 1:
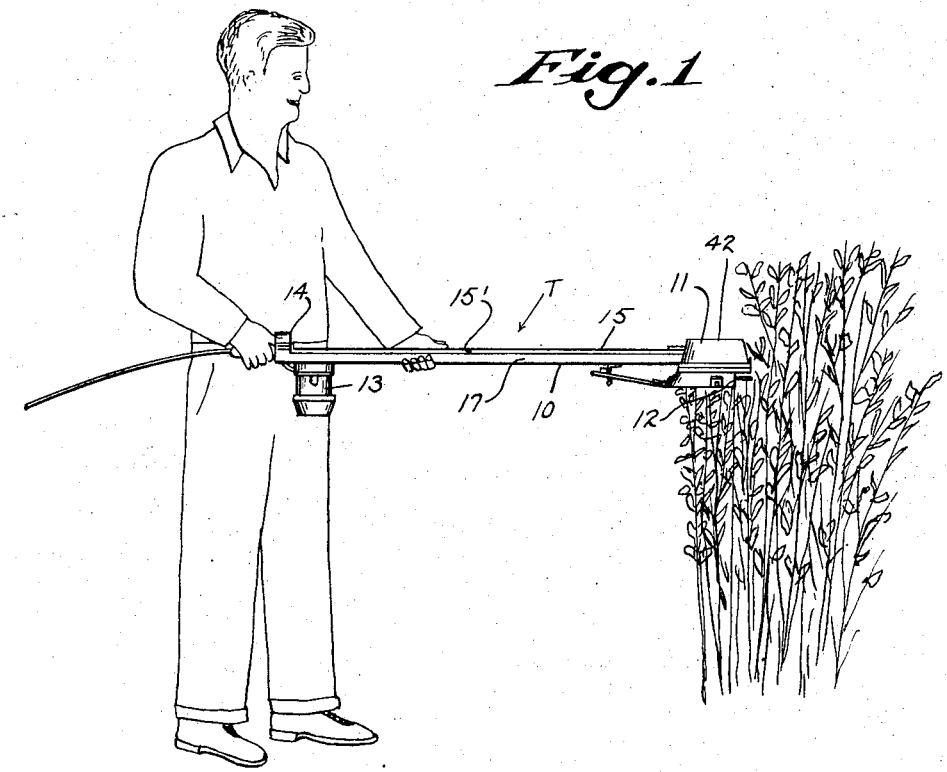

In the normal operation of the device, the cover is open as shown in FIGURES 1, 2 and 3 and in the full line position of FIGURE 4, and therefore, the forward lower edge of the cover is provided with a male latching member 52 which is adapted to be received between the spring fingers 53 of the female member attached to the housing 10 and more particularly wall 16 thereof. Further, just forward of the female latch member 53 and adjacent thereto is an L-shaped stop member 54 which tends to strengthen and hold the cover in its open operative position.

It should also be noted that blade 39 is detachably secured to its shaft so that various types of blades may be used depending on the desired operation of the device. Generally speaking the blade when rotating projects slightly beyond the leading edge of the device per se. In the general use of the device, the cover is moved to its full line position so that the entire blade may be presented to the shrubbery or hedges, and a fairly substantial cut may be accomplished. However, in forming hedges and shrubs of various shapes, particularly referred to in the trade as "sculpturing," a fine control of the trimmer must be had. Therefore, the cover is moved to its closed dotted line position, FIGURE 4, and only the leading edge of the blade is presented to the work. It should also be noted that when the device is held in the position shown in FIGURE 1, a very fine control is had, since the device is finely balanced—the motor being at one end (rear) and the cutter at the extreme opposite end (front) and by manipulating the handle 24 the device may be pivoted about its point of balance and easily manipulated. Further, when cutting at a higher angle than shown, i.e., even with or above the operator's head, debris could be thrown back into the face of the operator. However, with the cover in its closed position debris will be caught in the trough-like space 55, and thus the operator can continue his work without annoyance or without fear of being struck by cut debris.

In order to clean the trough or space 55 in its only necessary to pivot the cover from its dotted line to full line position, and the debris will immediately drop therefrom or can be easily removed.

Thus, an important feature of the invention is the fine balance accomplished by providing the elongated casing or housing 10 at the rear end of which the motor is adjustably mounted, and it is at this end that the operator grips the device with one hand while the other is placed at the approximate point of balance between the motor and cutter at the forward end. Thus, the device may be easily carried, manipulated and used in difficult places. The adjustable feature of the motor is also important since the belt 36 can be trained about the drive pulley 35 and pulley 37, and then the screws 30 of the motor loosened, and the motor moved toward the rear portion of the device to put a proper tension on the pulley. I also prefer, although it is not absolutely necessary to put a twist or turn 56 in the pulley per se, inasmuch as this gives a better and more positive drive and also keeps the belt confined within the elongated casing 10.

It is also important to note that while the toggle switch 28 may be of a simple "On" and "Off" type, it may also be of the tension type, wherein when the toggle is moved to its dotted line position FIGURE 5, the motor will run, and when released will automatically return to the full line position and stop running. I also wish to stress that the guard 29 and its function is to prevent the accidental movement of the toggle switch to its dotted line position, which actuates and starts the device.

Thus, while I have shown and described certain specific embodiments of the invention, it will be readily understood that these are merely for the purpose of illustration and description, that various other forms may be devised and that changes may be made in the proportions and minor details of construction without departing from the spirit of the invention or scope of the appended claims.

What is claimed as new is:

1. A lawn manicuring device for cutting, shaping and trimming shrubs, hedges and lawn edges including, an elongated longitudinally extending casing having continuous walls defining a substantially uninterrupted longitudinally extending space and channel, said channel being open at both ends, a drive motor secured adjacent one end of said casing, a drive shaft for said motor projecting into said space and channel, a rearwardly extending handle secured to said elongated longitudinally extending casing adjacent to said drive motor, a rotating cutting blade carried by the other end of said casing including, a driven shaft for said blade received in suitable bearings, at least part of said driven shaft extending into said space and channel and in alignment with said drive shaft for rotating said driven shaft, means in operative connection with said drive shaft for rotating said drive shaft, said means including a pair of pulleys each secured to a respective shaft and a drive belt trained about said pulleys, means for adjusting the tension of said drive belt, a source of power for said motor, a housing for said cutter having an open lower and forward end exposing at least a portion of said cutter blade, the point of balance between said motor and cutter blade and its housing being located intermediate said elongated casing, and a pivoted cover for said lower end of said cutter housing for closing only said lower end, said cutter blade rotating in a horizontal plane and extending beyond the peripheral edge of said housing, said cover having an open position completely exposing the cutter blade and a closed debris collecting position.

2. A lawn manicuring device as set forth in claim 1, wherein said elongated longitudinally extending housing is substantially rectangular in shape defining parallel extending top and bottom walls of a greater width than said parallel extending side walls.

References Cited

UNITED STATES PATENTS

| | | | |
|---|---|---|---|
| 953,876 | 4/1910 | Warner | 30—240 X |
| 1,871,606 | 8/1932 | Haddad | 30—167 |
| 2,263,431 | 11/1941 | White | 30—276 X |
| 2,532,982 | 12/1950 | Young | 30—276 X |
| 2,757,453 | 8/1956 | Brunson | 30—364 |

OTHELL M. SIMPSON, *Primary Examiner.*

J. C. PETERS, *Assistant Examiner.*